(12) United States Patent
Landschaft et al.

(10) Patent No.: US 8,352,830 B2
(45) Date of Patent: Jan. 8, 2013

(54) EXTRACTION OF VALUES FROM PARTIALLY-CORRUPTED DATA PACKETS

(75) Inventors: Assaf Landschaft, Munich (DE); Ronen Shevach, Natanya (IL)

(73) Assignee: Agere Systems LLC, Allentown, PA (US)

( * ) Notice: Subject to any disclaimer, the term of this patent is extended or adjusted under 35 U.S.C. 154(b) by 372 days.

(21) Appl. No.: 12/676,201

(22) PCT Filed: Oct. 26, 2007

(86) PCT No.: PCT/US2007/082682
§ 371 (c)(1),
(2), (4) Date: Mar. 3, 2010

(87) PCT Pub. No.: WO2009/057856
PCT Pub. Date: Apr. 30, 2009

(65) Prior Publication Data
US 2010/0174973 A1    Jul. 8, 2010

(51) Int. Cl.
*H03M 13/00* (2006.01)
(52) U.S. Cl. .................. 714/758; 714/752; 714/781
(58) Field of Classification Search ............ 714/752, 714/758, 781
See application file for complete search history.

(56) References Cited

U.S. PATENT DOCUMENTS

| | | | | |
|---|---|---|---|---|
| 6,446,235 B1 * | 9/2002 | Drottar et al. | | 714/781 |
| 6,964,008 B1 * | 11/2005 | Van Meter, III | | 714/807 |
| 7,765,317 B1 * | 7/2010 | Micalizzi, Jr. | | 709/232 |
| 2002/0166095 A1 * | 11/2002 | Lavi et al. | | 714/786 |
| 2005/0108611 A1 * | 5/2005 | Vogt | | 714/758 |
| 2007/0089037 A1 | 4/2007 | Jiang | | |

FOREIGN PATENT DOCUMENTS

| | | |
|---|---|---|
| EP | 1337065 A1 | 8/2003 |
| EP | 1686718 A2 | 8/2006 |
| JP | 2002344429 A | 11/2002 |
| JP | 2011186990 A | 9/2011 |

OTHER PUBLICATIONS

PCT International Search Report dated Aug. 22, 2008, for PCT Publication No. WO/2009/054856.
Examiner's Office Letter; Mailed May 7, 2012 for corresponding JP Application No. 2010-530978.

* cited by examiner

*Primary Examiner* — Sam Rizk
(74) *Attorney, Agent, or Firm* — Mendelsohn, Drucker & Associates, P.C.; Edward J. Meisarosh; Steve Mendelsohn

(57) ABSTRACT

In one embodiment, a method for processing data packets having a payload and a checksum, wherein the payload has a first portion of interest. If a received data packet fails a CRC check, then it is determined whether the first portion has a valid relationship with one or more previous first portions of one or more corresponding previous payloads of one or more corresponding previous data packets. If the relationship is valid, then the first portion is output. The method enables recovery of first portions of interest from corrupted data packets having transmission errors in other parts of the data packets, thereby potentially decreasing retransmissions and increasing throughput.

21 Claims, 2 Drawing Sheets

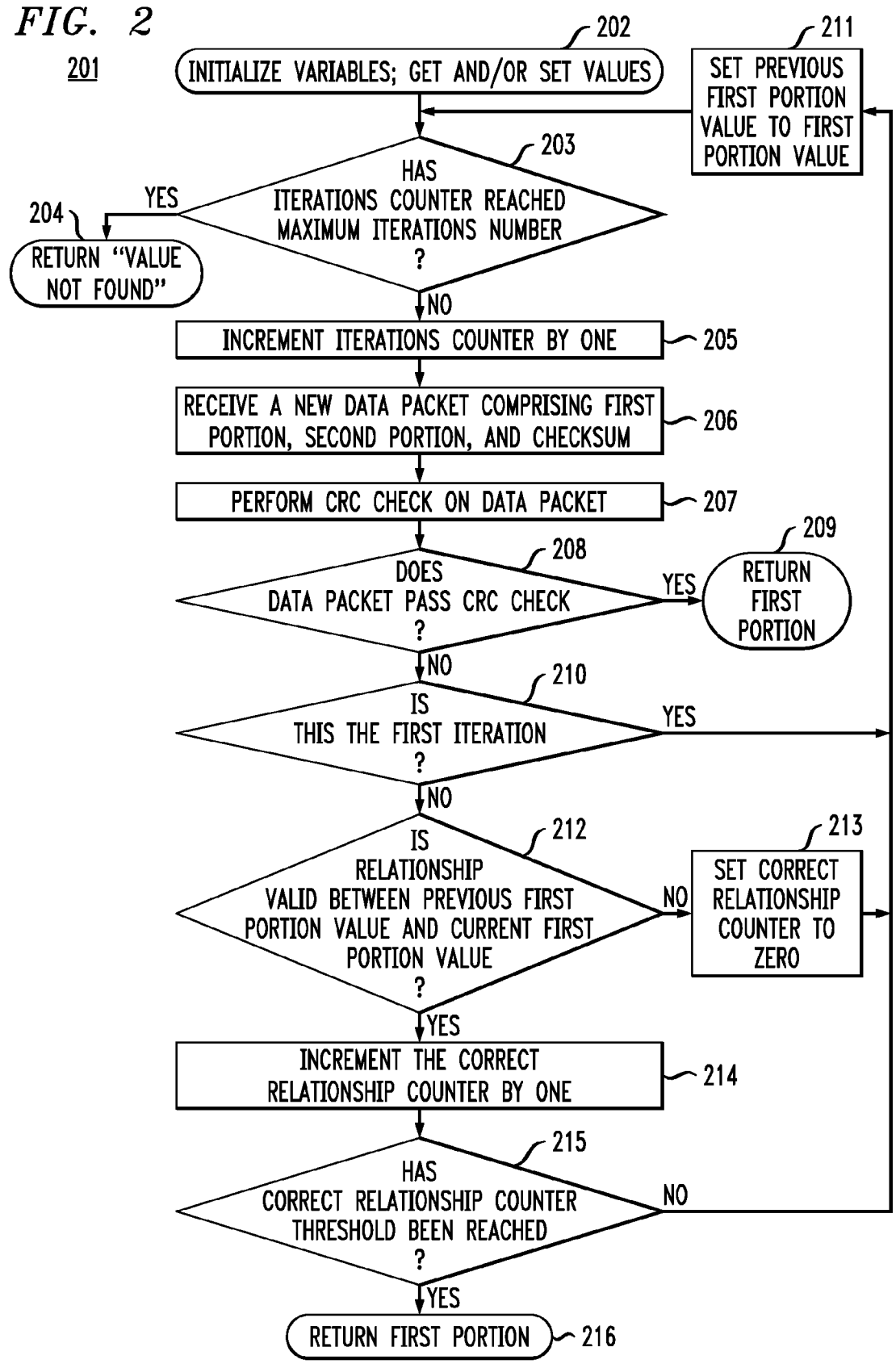

EXTRACTION OF VALUES FROM PARTIALLY-CORRUPTED DATA PACKETS

BACKGROUND OF THE INVENTION

1. Field of the Invention

The present invention relates to digital communication systems, and more particularly to packet-based digital communication systems.

2. Description of the Related Art

A communication system has a transmitter that sends data to a receiver. In a packet-based digital communication system, the transmitter encapsulates the digital data for transmission in data packets. Many data-encapsulation systems and methods are known in the art. A typical data packet comprises (i) a payload section that contains payload data, i.e., data for transmission to the receiver and (ii) a header section that contains routing and other useful information regarding the payload data. As used herein and unless otherwise indicated, the term "header" refers to data in a data packet that is not the payload data, wherein the header data may be located before and/or after the payload data in the data packet. Thus, the term "header" also encompasses footers. The payload data may itself comprise smaller data packets, each with its own payload section and header.

Errors in the transmission of data packets from transmitter to receiver, causing corrupted data packets, can be caused by various factors such as signal interference or signal noise. A typical way to detect transmission errors involves the use of a cyclic redundancy check (CRC) field in the header. CRC generation, by the transmitter, involves calculating a number, called a checksum, also known as parity bits, based on a payload section, and appending that checksum to the payload section for transmission to the receiver. CRC checking, by a receiver, involves calculating a checksum based on the received payload section and comparing that receiver-calculated checksum to the appended checksum, and if the two checksums do not match, then determining that a transmission error has occurred. Numerous algorithms for generating a checksum for a data packet exist.

It should be noted that it is possible for a transmission error to affect only the checksum, whereby the payload data is correctly received, but the corresponding data packet is nevertheless determined to be in error. Conversely, even if the two checksums do match, the transmitted payload data is not necessarily error-free as multiple errors can cancel the CRC effects of each other, thereby making it appear as if no errors occurred.

If the receiver determines that a transmission error occurred, then the receiver can request the transmitter to retransmit the affected data packet. Retransmissions reduce the overall throughput of the communication system, and systems and methods that reduce the number of retransmissions necessitated by corrupted data packets are useful.

SUMMARY OF THE INVENTION

In one embodiment, the invention can be a method for processing data packets in a receiver in a communication network. The method comprises receiving a current data packet comprising a current payload and a current checksum, wherein the current payload comprises a current first portion, and determining whether the current data packet passes or fails a cyclic redundancy check (CRC) check using the current payload and the current checksum. If it is determined that the current data packet fails the CRC check, then it is determined whether the current first portion has a valid relationship with one or more previous first portions of one or more previous payloads of one or more previous data packets. If it is determined that the current first portion has the valid relationship, then the current first portion is output.

In another embodiment, the invention can be a receiver for processing data packets in a communication network. The receiver comprises a memory and a processor. The memory is adapted to store a previous first portion of a previous data packet and a current data packet, wherein the current data packet has a current payload and a current checksum, wherein the current payload comprises a current first portion. The processor is adapted to (i) determine whether the current data packet passes or fails a CRC check using the current payload and the current checksum, and (ii) output the current first portion, if it is determined that the current data packet fails the CRC check and if it is determined that the current first portion has a valid relationship with one or more previous first portions.

In yet another embodiment, the invention can be a method for processing data packets in a receiver in a communication network. The method comprises the following steps. Receiving an initial data packet comprising an initial payload and an initial checksum, wherein the initial payload comprises an initial first portion. Determining whether the initial data packet passes or fails a CRC check using the initial payload and the initial checksum. Outputting the initial first portion, if it is determined that the initial data packet passes the CRC check, and otherwise: (i) setting a previous first portion substantially equivalent to the initial first portion, (ii) receiving a data packet comprising a payload and a checksum, wherein the payload comprises a first portion, (iii) determining whether the data packet passes or fails the CRC check using the payload and the checksum, and (iv) outputting the first portion, if it is determined that the data packet passes the CRC check, and otherwise: (1) determining whether the first portion has a valid relationship with the previous first portion, (2) outputting the first portion, if it is determined that the first portion has the valid relationship, and (3) setting the previous first portion substantially equivalent to the first portion and repeating steps (ii)-(iv), if it is determined that the first portion does not have the valid relationship.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 2 shows a flow chart for a procedure in accordance with one embodiment of the present invention.

DETAILED DESCRIPTION

Figure 1:
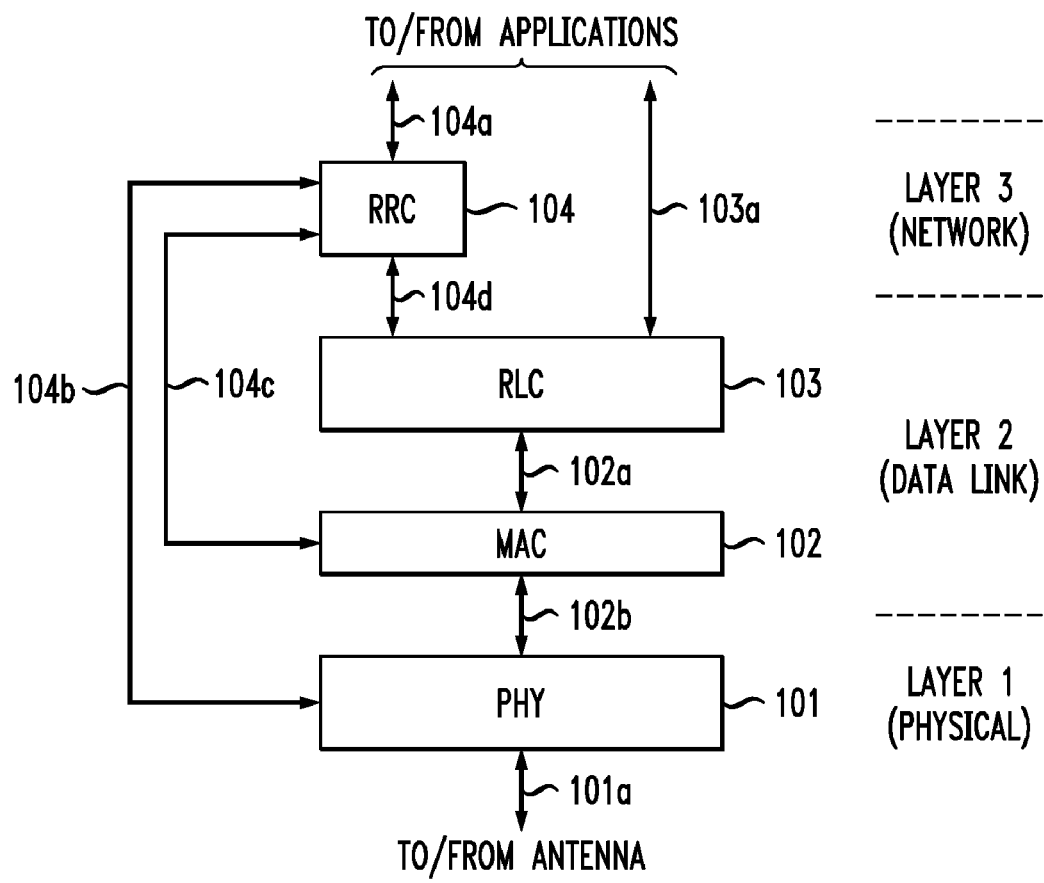
FIG. 1 shows a simplified partial block diagram of the 3G protocol stack in an exemplary UE.

One type of communication system uses third-generation (3G) mobile telephony communication devices, also known as 3G mobile phones. Third-generation mobile phones use digital radio signals for communication with cell towers, also known as base stations. In 3G telephony, a mobile phone is also known as a user equipment (UE), while a base station is also known as a Node-B. A Node-B is part of the Universal Mobile Telecommunications System (UMTS) Terrestrial Radio Access Network (UTRAN). Third-generation mobile phones are able to simultaneously transfer multiple data streams, such as voice, e-mail, instant messages, and streaming audio or video. Third-generation mobile phones additionally allow for high rates of data transfers and broadband capabilities. The high rates of data transfers rely on efficient organization and transmission of data to and from the applications running on a mobile phone. The organization and transmission of data is defined by protocols and standards.

Third-generation mobile phone standards are set by the Third Generation Partnership Project (3GPP) and are based on UMTS network technology, which evolved from Global System for Mobile Communication (GSM) network technology. The 3GPP organization comprises several Technical Specification Groups (TSGs), each responsible for a particular area of third-generation technology. One way to categorize 3G technology is by communication layers and protocols. The 3G protocol stack includes at least three layers: (i) layer 1, also known as the physical layer, (ii) layer 2, also known as the data link layer, and (iii) layer 3, also known as the network layer. The physical layer handles communication between the mobile phone and a base station, the data link layer interfaces between the physical and network layers, and the network layer handles communication with applications on the mobile phone.

Layer 1 architecture and design is specified by Working Group 1 (WG1) of the Radio Access Network (RAN) TSG. This includes the specification of the physical channel structures, the mapping of transport channels to physical channels, spreading, modulation, physical layer multiplexing, channel coding, and error detection. The technical specifications (TS) provided by the RAN TSG working groups are periodically updated and multiple releases are published, including in conjunction with new releases of the 3GPP standard.

Layer 2 and layer 3 architecture and design are regulated by Working Group 2 (WG2) of the RAN TSG, which is in charge of the radio interface architecture and protocols (Media Access Control (MAC), Radio Link Control (RLC), Packet Data Convergence Protocol (PDCP)), the specification of the Radio Resource Control (RRC) protocol, the strategies of radio resource management, and the services provided by the physical layer to the upper layers. The MAC protocol specifies, among other things, (i) communication channels and (ii) protocol data units (PDUs), formats, and parameters, for communication between the physical layer and the RLC layer of a mobile phone.

FIG. 1 shows a simplified partial block diagram of the 3G protocol stack in an exemplary UE. The various communication paths shown can be direct or indirect and can include intermediary elements that are not shown in the figure or described herein. Layer 1 comprises physical layer 101, which communicates with an antenna (not shown) via path 101a and with layer 2 via path 102b. Path 102b comprises signaling and transport channels. Transport channels are data flows between the data link layer and the physical layer. Data in the transport channels is organized into packets. Outgoing transport channels can be combined onto composite transport channels for radio transmission between a mobile phone and a base station using physical layer 101.

Layer 2 comprises Media Access Control (MAC) layer 102 and Radio Link Control (RLC) layer 103, which communicate via path 102a, wherein path 102a comprises logical channels. Logical channels are data flows within layer 2 associated with applications running on the mobile phone. The data flows are organized into packets in the logic channels.

Layer 3 includes Radio Resource Controller (RRC) entity 104, which controls and communicates with physical layer 101, MAC layer 102, and RLC layer 103 via paths 104b, 104c, and 104d, respectively. RRC 104 communicates with applications running on the mobile phone via path 104a. RLC layer 103 can also communicate with applications running on the mobile phone via path 103a, either directly or through intermediary entities (not shown) in layer 3.

Two types of logical channels are control channels and traffic channels. Control channels are used for the transfer of control-plane information. Control channels include the broadcast control channel (BCCH), paging control channel (PCCH), dedicated control channel (DCCH), and common control channel (CCCH). The BCCH is used by a Node-B to broadcast system control information to UEs in the Node-B's cell. The system control information includes parameters that allow a UE to identify and access the Node-B. The BCCH logical channel is mapped onto the broadcast channel (BCH) transport channel (TCH). The BCH is a downlink broadcast channel used to transmit system and cell information over the entire cell. The BCH is in turn mapped onto the primary common control physical channel (P-CCPCH).

One embodiment of the invention comprises a UE that operates in a 3G system, wherein a regular communication frame is 10 ms. A BCCH communication frame, or data packet, comprises approximately 244 data bits and 16 CRC bits, and is broadcast every two frames, i.e., every 20 ms. The BCCH data packet includes a cell system frame number (SFN), which is a 12-bit counter used as a timing reference for devices within a cell. The SFN increases by two with every consecutive BCCH data packet. The SFN is important for frame identification, which is used in operations such as those occurring in handover situations, wherein communication with the UE is handed over from one Node-B to another, e.g., where the UE moves from one cell to another. Frame identification is also useful for operations involving sleep mode. For certain applications on the UE, such as an application involved with handover, only the SFN portion of a BCCH data packet is necessary. If the UE receives, for the handover application, a BCCH data packet that fails a CRC check, then rather than discarding the entire data packet and requesting a retransmission, the UE performs a procedure to determine, with a high degree of certainty, the SFN of the BCCH data packet. The procedure uses the fact that, as described above, the relationship between the SFN of a current data packet and the SFN of the preceding data packet is defined and known. Thus, if a correct SFN is determined for a data packet, then the correct SFNs for previous and subsequent data packets can be determined using the defined and known relationship.

FIG. 2 shows flow chart 201 for a procedure in accordance with one embodiment of the present invention. The procedure starts with setting, initializing, and/or receiving variables and constant values needed for the procedure (step 202). Variables include an iterations counter, a valid-relationship counter, and a previous first-portion value. These variables are initialized to nil or zero, as appropriate. Constant values include a maximum iterations number and correct-relationship threshold. The maximum iterations number determines the maximum number of data packets the procedure will go through before effectively giving up and determining that a correct SFN value cannot be recovered with sufficient confidence. The constant values may be predetermined, or may be determined dynamically by the procedure, such as by receipt from another entity.

Next, it is determined whether the maximum number of iterations has been reached (step 203). For normal operation, the maximum number of iterations should be set to a positive integer. If the maximum number of iterations has been reached, which should not be the case on the first iteration, then the procedure provides an indication that a correct SFN value was not found (step 204). Otherwise, the iterations counter is incremented by one (step 205).

A new data packet is then received, wherein the data packet comprises a first portion, a second portion, and a checksum (step 206). The first portion is the SFN section, the second portion is the rest of the user-data portion of the data packet. A CRC check is performed on the data packet (step 207), and it is determined whether the data packet passes the CRC check (step 208), i.e., whether the receiver-calculated checksum matches the received checksum. If the data packet passes the CRC check, then it is determined that the data packet contains no transmission errors, and the first portion, i.e., the SFN, is returned as the result of the procedure (step 209). If the data packet fails the CRC check, then it is determined whether this is the first iteration of the procedure (step 210). If it is the first iteration of the procedure, then the previous first-portion variable is set to the current data packet's first portion (step 211), so that it can be used in the next iteration, and the procedure returns to step 203. If it is not the first iteration, i.e., if this data packet and one or more consecutive preceding data packet failed their corresponding CRC checks, then it is determined whether the current first portion is related to the previous first portion in the manner specified by the known and defined relationship, i.e., whether their relationship is valid (step 212).

If the relationship between the current first portion and the previous first portion is not valid, then the valid-relationship counter is set to zero (step 213), the previous first-portion variable is set to the current data packet's first portion (step 211), and the procedure returns to step 203. It should be noted that, as used herein and unless otherwise indicated, the verb "set" and its variants refer to ensuring a particular result and not a process, and thus, do not require a specific active step, therefore, e.g., if the valid-relationship counter is already at zero, then step 213 can comprise doing nothing more than moving the procedure to step 211.

If the relationship between the current first portion and the previous first portion is valid, then the valid-relationship counter is incremented by one (step 214). Then, it is determined whether the valid-relationship counter threshold has been reached (step 215). If the valid-relationship counter threshold has been reached, then the procedure returns the current first portion as the procedure result (step 216). If the valid-relationship counter threshold has not yet been reached, then the previous first-portion variable is set to the current data packet's first portion (step 211), and the procedure returns to step 203.

The higher the valid-relationship counter threshold is set, the greater the probability that a resultant first-portion value is correct. For example, assume that (i) a transmission channel has a 1% error rate, (ii) the valid-relationship counter threshold is set to three, and (iii) the maximum iterations number is set to ten. The probability that a 12-bit SFN has one or more erroneous bits is $1-(0.99)^{12}$, or approximately 11%. The probability that a 244-bit data packet has one or more erroneous bits is $1-(0.99)^{244}$, or approximately 91%. Thus, there is a very high probability that, with the above assumptions, each of a series of consecutive data packets will fail a CRC check. Using prior-art retransmission requests, it would be virtually impossible for the receiver to obtain a correct SFN. However, using the above-described embodiment, there is a non-negligible probability of obtaining a correct SFN from a series of partially-corrupted data packets with a high degree of certainty that an SFN result that is determined by the procedure to be correct is actually correct. The probability for 3 consecutive error free SFNs is approximately $0.89^3$ or approximately 70%. In general, the probability of x strings of at least k consecutive error-free SFNs within n consecutive frames, where the per-SFN probability of success is p and of error is q (which equals 1−p) can be represented by:

$$\sum_{m=x}^{\left[\frac{n+1}{k+1}\right]}(-1)^{m-x}\binom{m}{x}\sum_{y=m-1}^{n-mk}\binom{y+1}{m}\binom{n-mk}{y}p^{n-y}q^y \quad (1)$$

Figure 3:
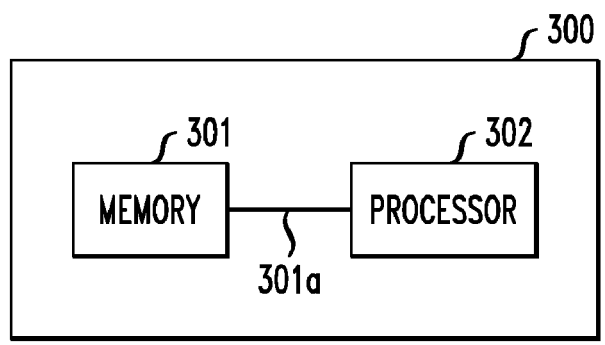
FIG. 3 shows a receiver in accordance with one embodiment of the present invention.

FIG. 3 shows receiver 300 comprising memory 301 and processor 302, which are connected via path 301a. Memory 301 is adapted to contain at least a current data packet and a first portion of a previous data packet. Processor 302 is adapted to perform CRC checks on data packets, determine whether a valid relationship exists between a current first portion and a previous first portion, and perform other processing and control functions as necessary. Receiver 300 comprises additional components and connections (not shown) that perform additional functions.

One embodiment of the present invention has been described comprising particular steps in a particular order. However, as would be appreciated by one of ordinary skill in the art, steps in the procedure can be re-arranged, combined, and/or otherwise modified while remaining within the scope of the present invention. For example, in one alternative embodiment, the steps of (i) receiving a new data packet, (ii) performing a CRC check, (iii) determining if the data packet passes, and (iv) if so, then returning the SFN, are performed first, before the steps of (i) determining whether the maximum number of iterations has been reached, and (ii) if not, then increasing the iterations counter by one.

One embodiment of the present invention has been described with a 260-bit data packet including (i) a 244-bit user-data payload section including a 12-bit SFN as the first portion and (ii) a 16-bit checksum. Alternative embodiments comprise data packets, first portions, second portions, and checksums of different sizes. Alternative embodiments comprise data packets that do not include an SFN field. In one alternative embodiment, the user-data portion of the data packet comprises only the first portion, i.e., there is no second portion.

One embodiment of the present invention has been described wherein the relationship between a first-portion value and a previous first-portion value is an increase by two. In alternative embodiments the relationship between the first portions of two consecutive data packets is defined differently. In one alternative embodiment, the relationship between the first portions of two consecutive data packets is that the first portions are substantially the same.

One embodiment of the present invention has been described wherein it is determined whether a valid relationship exists between a current first portion and a previous first portion. It should be noted that if a valid relationship exists between the current first portion and a previous first portion and a valid relationship exists between the previous first portion and one or more additional previous first portions, then a valid one-to-many relationship also exists between the current first portion and the set of (i) the previous first portion and (ii) the one or more additional first portions. For example, if the valid-relationship counter is at three, indicating that the current first portion is the fourth in a series of first portions that have valid relationships between them, then there is a valid relationship between the current first portion and all three of those first portions. In one alternative embodiment, wherein a valid-relationship counter is not needed, a set number of first portions are cached and it is determined whether there is a valid relationship between the current first portion and those first portions. With every new iteration of the method, the cache is updated to include last current first portion and remove the oldest first portion.

In an alternative embodiment, the relationship between a current data packet and the preceding data packet is dynamically determined rather than being preset. Thus, the entity executing a procedure in accordance with an embodiment of the present invention receives one or more parameters that define the correct relationship between a first portion of a first data packet and a first portion of a subsequent data packet.

In an alternative embodiment, no maximum number of iterations is set for the procedure. The procedure could be terminated by other means, such as an interrupt from another entity or a time limit.

Exemplary embodiments have been described wherein counters are reset by being set to zero. However, the invention is not limited to resetting by setting to zero. In an alternative embodiment, reset counters are set to a value other than zero.

Exemplary embodiments have been described using the 3GPP standard. However, the invention is not limited to 3GPP implementations. The invention is applicable to any suitable communication standard that is adapted, as part of data transmission, to perform a CRC check on received data packets.

Exemplary embodiments have been described wherein particular entities (a.k.a. modules) perform particular functions. However, the particular functions may be performed by any suitable entity and are not restricted to being performed by the particular entities named in the exemplary embodiments.

Exemplary embodiments have been described with data flows between entities in particular directions. Such data flows do not preclude data flows in the reverse direction on the same path or on alternative paths that have not been shown or described. Paths that have been drawn as bidirectional do not have to be used to pass data in both directions.

As used herein, the term "mobile phones" refers generically to mobile wireless telephony communication devices, and includes mobile communication devices that function as telephones, as well as mobile communication devices that do not necessarily function as telephones, e.g., a mobile device that transmits instant messages and downloads streaming audio, but is not adapted to be held up to a user's head for telephonic conversation.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

As used herein in reference to data transfers between entities in the same device, and unless otherwise specified, the terms "receive" and its variants can refer to receipt of the actual data, or the receipt of one or more pointers to the actual data, wherein the receiving entity can access the actual data using the one or more pointers.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing steps in a software program. Such software may be employed in, for example, a digital signal processor, microcontroller, or general-purpose computer.

It will be further understood that various changes in the details, materials, and arrangements of the parts which have been described and illustrated in order to explain the nature of this invention may be made by those skilled in the art without departing from the scope of the invention as expressed in the following claims.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Unless explicitly stated otherwise, each numerical value and range should be interpreted as being approximate as if the word "about" or "approximately" preceded the value of the value or range. As used in this application, unless otherwise explicitly indicated, the term "connected" is intended to cover both direct and indirect connections between elements.

Although the steps in the following method claims are recited in a particular sequence with corresponding labeling, unless the claim recitations otherwise imply a particular sequence for implementing some or all of those steps, those steps are not necessarily intended to be limited to being implemented in that particular sequence.

We claim:

1. A method for processing data packets in a receiver in a communication network, the method comprising:
   (a) receiving a current data packet comprising a current payload and a current checksum, wherein the current payload comprises a current first portion and a current second portion that is separate from the current first portion;
   (b) determining whether the current data packet passes or fails a cyclic redundancy check (CRC) check using the current payload and the current checksum; and
   (c) if it is determined that the current data packet fails the CRC check, then:
      (c1) determining whether the current first portion has a valid relationship with one or more previous first portions of one or more previous payloads of one or more previous data packets; and
      (c2) if it is determined that the current first portion has the valid relationship, then outputting the current first portion.

2. The method of claim 1, further comprising:
   (d) if it is determined that the current data packet passes the CRC check, then outputting the current first portion.

3. The method of claim 1, wherein the current second portion is not outputted as a result of the method.

4. The method of claim 1, wherein step (c1) determines that the current first portion has the valid relationship with two or more previous first portions.

5. The method of claim 1, wherein:
   the communication network is a 3GPP-compatible wireless communication network; and
   the receiver is part of a 3GPP-compatible UE.

6. The method of claim 5, wherein:
   the data packet is a broadcast control channel (BCCH) data packet; and
   the first portion is a system frame number (SFN).

7. The method of claim 1, wherein step (c1) further comprises updating a valid-relationship counter, wherein:

if it is determined that the current first portion has the valid relationship, then incrementing the valid-relationship counter; and if it is determined that the current first portion does not have the valid relationship, then resetting the valid relationship counter.

8. The method of claim 7, wherein step (c2) comprises:

if it is determined that the valid-relationship counter has reached a valid-relationship counter threshold, then outputting the current first portion; and if it is determined that the valid-relationship counter has not reached the valid-relationship counter threshold, then updating a cache of one or more previous first portions to include the current first portion and repeating steps (a)-(c) for a new current data packet.

9. The method of claim 1, further comprising:

incrementing an iterations counter with the receipt of the current data packet; and terminating the method without outputting the current first portion, if it is determined that the iterations counter has reached a maximum-iterations number.

10. The method of claim 9, further comprising updating a cache of one or more previous first portions to include the current first portion and repeating steps (a)-(c) for a new current data packet, if the iterations counter has not reached the maximum-iterations number.

11. The method of claim 1, wherein the method is used in the handover of a mobile communication device from a first base station of the mobile communication network to a second base station of the mobile communication network.

12. A receiver for processing data packets in a communication network, the receiver comprising:

(a) a memory adapted to store a previous first portion of a previous data packet and a current data packet, wherein the current data packet has a current payload and a current checksum, wherein the current payload comprises a current first portion and a current second portion that is separate from the current first portion; and (b) a processor adapted to:

determine whether the current data packet passes or fails a CRC check using the current payload and the current checksum; and output the current first portion, if it is determined that the current data packet fails the CRC check and if it is determined that the current first portion has a valid relationship with one or more previous first portions.

13. The receiver of claim 12, wherein the processor is further adapted to output the current first portion, if it is determined that the current data packet passes the CRC check.

14. The receiver of claim 12, wherein the processor is adapted to determine whether the current first portion has the valid relationship with two or more previous first portions.

15. The receiver of claim 12, wherein:

the receiver further comprises a valid-relationship counter;

the processor is further adapted to update the valid-relationship counter, wherein:

if it is determined that the current first portion has the valid relationship, then the valid-relationship counter is incremented; and if it is determined that the current first portion does not have the valid relationship, then the valid relationship counter is reset.

16. A method for processing data packets in a receiver in a communication network, the method comprising:

(a) receiving an initial data packet comprising an initial payload and an initial checksum, wherein the initial payload comprises an initial first portion and an initial second portion that is separate from the initial first portion;

(b) determining whether the initial data packet passes or fails a CRC check using the initial payload and the initial checksum;

(c) outputting the initial first portion, if it is determined that the initial data packet passes the CRC check, and otherwise:

(i) setting a previous first portion substantially equivalent to the initial first portion;

(ii) receiving a data packet comprising a payload and a checksum, wherein the payload comprises a first portion;

(iii) determining whether the data packet passes or fails the CRC check using the payload and the checksum; and (iv) outputting the first portion, if it is determined that the data packet passes the CRC check, and otherwise:

(1) determining whether the first portion has a valid relationship with the previous first portion;

(2) outputting the first portion, if it is determined that the first portion has the valid relationship; and (3) setting the previous first portion substantially equivalent to the first portion and repeating steps (ii)-(iv), if it is determined that the first portion does not have the valid relationship.

17. The method of claim 16, wherein:

step (1) further comprises:

incrementing a valid-relationship counter, if it is determined that the first portion has the valid relationship; and resetting the valid-relationship counter, if it is determined that the first portion does not have the valid relationship; and step (2) comprises outputting the first portion if it is determined that the first portion has the valid relationship and if it is determined that the valid-relationship counter has reached the valid-relationship counter threshold.

18. The method of claim 16, wherein:

step (a) further comprises incrementing an iteration counter; and the method terminates without outputting the first portion, if it is determined that the iterations counter reaches a maximum-iterations number.

19. A method for processing data packets in a receiver in a communication network, the method comprising:

(a) receiving a current data packet comprising a current payload and a current checksum, wherein the current payload comprises a current first portion;

(b) determining whether the current data packet passes or fails a cyclic redundancy check (CRC) check using the current payload and the current checksum; and (c) if it is determined that the current data packet fails the CRC check, then:

(c1) (i) determining whether the current first portion has a valid relationship with one or more previous first portions of one or more previous payloads of one or more previous data packets and (ii) updating a valid-relationship counter, wherein:

if it is determined that the current first portion has the valid relationship, then incrementing the valid-relationship counter; and if it is determined that the current first portion does not have the valid relationship, then resetting the valid relationship counter; and (c2) if it is determined that the current first portion has the valid relationship, then outputting the current first portion.

20. A receiver for processing data packets in a communication network, the receiver comprising:
   (a) a memory adapted to store a previous first portion of a previous data packet and a current data packet, wherein the current data packet has a current payload and a current checksum, wherein the current payload comprises a current first portion;
   (b) a valid-relationship counter; and
   (c) a processor adapted to:
   determine whether the current data packet passes or fails a CRC check using the current payload and the current checksum;
   output the current first portion, if it is determined that the current data packet fails the CRC check and if it is determined that the current first portion has a valid relationship with one or more previous first portions; and
   update the valid-relationship counter, wherein:
      if it is determined that the current first portion has the valid relationship, then the valid-relationship counter is incremented; and
      if it is determined that the current first portion does not have the valid relationship, then the valid relationship counter is reset.

21. A method for processing data packets in a receiver in a communication network, the method comprising:
   (a) receiving an initial data packet comprising an initial payload and an initial checksum, wherein the initial payload comprises an initial first portion;
   (b) determining whether the initial data packet passes or fails a CRC check using the initial payload and the initial checksum;
   (c) outputting the initial first portion, if it is determined that the initial data packet passes the CRC check, and otherwise:
      (i) setting a previous first portion substantially equivalent to the initial first portion;
      (ii) receiving a data packet comprising a payload and a checksum, wherein the payload comprises a first portion;
      (iii) determining whether the data packet passes or fails the CRC check using the payload and the checksum; and
      (iv) outputting the first portion, if it is determined that the data packet passes the CRC check, and otherwise:
         (1) (a) determining whether the first portion has a valid relationship with the previous first portion, (b) incrementing a valid-relationship counter, if it is determined that the first portion has the valid relationship, and (c) resetting the valid-relationship counter, if it is determined that the first portion does not have the valid relationship;
         (2) outputting the first portion, if it is determined that the first portion has the valid relationship and if it is determined that the valid-relationship counter has reached the valid-relationship counter threshold; and
         (3) setting the previous first portion substantially equivalent to the first portion and repeating steps (ii)-(iv), if it is determined that the first portion does not have the valid relationship.

* * * * *

UNITED STATES PATENT AND TRADEMARK OFFICE
CERTIFICATE OF CORRECTION

| | | |
|---|---|---|
| PATENT NO. | : 8,352,830 B2 | |
| APPLICATION NO. | : 12/676201 | |
| DATED | : January 8, 2013 | |
| INVENTOR(S) | : Assaf Landschaft and Ronen Shevach | |

It is certified that error appears in the above-identified patent and that said Letters Patent is hereby corrected as shown below:

On the title page, Item 87 (PCT Pub. No.) is incorrect. Delete "WO2009/057856" and replace with --WO2009/054856--.

Signed and Sealed this
Twenty-ninth Day of April, 2014

Michelle K. Lee
*Deputy Director of the United States Patent and Trademark Office*